United States Patent
Maegawa et al.

(10) Patent No.: US 7,943,072 B2
(45) Date of Patent: May 17, 2011

(54) METHOD FOR PRODUCING A RESIN MOLDED ARTICLE

(75) Inventors: Akihito Maegawa, Yokkaichi (JP); Shinyu Nagashima, Kariya (JP)

(73) Assignee: Sumitomo Wiring Systems, Ltd. (JP)

( * ) Notice: Subject to any disclaimer, the term of this patent is extended or adjusted under 35 U.S.C. 154(b) by 992 days.

(21) Appl. No.: 11/823,748

(22) Filed: Jun. 28, 2007

(65) Prior Publication Data

US 2008/0000668 A1    Jan. 3, 2008

(30) Foreign Application Priority Data

Jun. 29, 2006  (JP) ................. 2006-179902

(51) Int. Cl.
  *B29C 45/14* (2006.01)
(52) U.S. Cl. ............. 264/250; 264/272.15; 264/272.17; 264/275
(58) Field of Classification Search .......... None
  See application file for complete search history.

(56) References Cited

U.S. PATENT DOCUMENTS

| | | | |
|---|---|---|---|
| 6,527,989 B1 | 3/2003 | Onoda | |
| 6,856,057 B2 * | 2/2005 | Kobayashi et al. | 310/71 |
| 7,336,469 B2 * | 2/2008 | Takanashi et al. | 361/142 |
| 7,414,194 B2 * | 8/2008 | Nakayama et al. | 174/68.2 |
| 7,488,904 B2 * | 2/2009 | Maegawa et al. | 174/521 |
| 2005/0218558 A1 * | 10/2005 | Asao | 264/272.11 |
| 2005/0227036 A1 * | 10/2005 | Takanashi | 428/67 |
| 2007/0026744 A1 * | 2/2007 | Takanashi | 439/736 |
| 2010/0200264 A1 * | 8/2010 | Maegawa et al. | 174/68.2 |

FOREIGN PATENT DOCUMENTS

JP     2003134753     * 5/2003

* cited by examiner

*Primary Examiner* — Edmund H. Lee

(74) *Attorney, Agent, or Firm* — Gerald E. Hespos; Michael J. Porco

(57) ABSTRACT

A resin molded article (1) is formed such that a primary molded article (10), collars (40) and a metal flat plate (50) are molded integrally as inserts in a secondary molded portion (30). A rib (12) extends in a longitudinal direction along a surface of the primary molded article (10) that is adjacent to a surface facing a gate (62), but not a terminal surface (13). Supports (61) are provided intermittently along the longitudinal direction on a cavity inner surface (63) of a molding die (60) for supporting the rib (12). The primary molded article (10) is reinforced by the rib (12), and is not likely to be deformed by resin injected from the gate (62) and is not likely to be displaced.

4 Claims, 8 Drawing Sheets

METHOD FOR PRODUCING A RESIN MOLDED ARTICLE

BACKGROUND OF THE INVENTION

1. Field of the Invention

The invention relates to a method for producing a resin molded article, to a resin molded article and to a molding die therefor.

2. Description of the Related Art

U.S. Pat. No. 6,527,989 discloses a resin molded article produced by molding a primary molded article that has a busbar embedded inside as an insert. An engaging hole is formed in a terminal surface at an end of the busbar drawn to the outside, and a positioning projection of the molding die engages the engaging hole to prevent displacements of the primary molded article during insert molding. A rib also is provided on a surface opposite the surface facing a gate, and is used during injection molding to determine whether the primary molded article is deformed. Specifically, molten resin injected from the gate can deform the primary molded article and can press the rib strongly against the molding die, even though the engaging hole is positioned. The deformed rib will be exposed at the outer surface after secondary molding, and indicates that the primary molded article is deformed.

The engaging hole is formed in the terminal surface that is used for connection with a mating connector, and remains on the outer surface of the resin molded article after the insert molding. There is a likelihood of shorting terminals due to water collected in the engaging holes or the like, if more engaging holes are formed to prevent deformation of the primary molded article. As a result, even if this construction can detect whether the primary molded article is deformed, it cannot prevent the deformation of the primary molded article itself.

The invention was developed in view of the above situation, and an object thereof is to perform positioning using a rib for reinforcing a primary molded article.

SUMMARY OF THE INVENTION

The invention relates to a method for producing a resin molded article so that at least one busbar is at least partly incorporated inside an elongate primary molded article and extends substantially along the longitudinal direction of the primary molded article. The primary molded article is set in a molding die and a secondary molded portion is formed integrally on at least one outer surface of the primary molded article by insert molding. At least one rib extends substantially in the longitudinal direction of the primary molded article along a surface of the primary molded article that is substantially adjacent to the surface facing a gate in the molding die. However, the rib is not a terminal surface where one portion of the busbar is drawn out. The rib increases the strength of the primary molded article so that the molten resin injected from the gate during insert molding will not deform the primary molded article.

At least one support preferably is provided intermittently along the longitudinal direction on an inner surface of the molding die to support the rib. The support prevents a forward displacement of the primary molded article in an injection direction of the molten resin. As a result, the primary molded article can be positioned without forming an engaging hole in the terminal surface.

Insert molding that injects resin at an angle to the longitudinal direction of the molded article has a desirable effect of moving the resin a shorter distance when compared to injecting the resin along the longitudinal direction from one longitudinal end. Unfortunately, the primary molded article is more likely to deform if the resin is injected at an angle to the longitudinal direction. However, the rib that extends substantially along the longitudinal direction of the primary molded article prevents deformation of the primary molded article in an injection direction.

The projecting height of parts of the rib except those supported by the support preferably is shorter than a distance between the surface where the rib is formed and the cavity inner surface of the molding die facing this surface. Accordingly, parts of the rib supported by the supports of the molding die remain as recesses on the outer surface of the resin molded article after the insert molding. However, other parts are covered by the secondary molded portion. Thus, problems such as water entering through a boundary between the rib and the secondary molded portion are reduced.

The support preferably sandwiches the rib at an angle to an injection direction to prevent forward and backward displacements of the primary molded article along the injection direction of the molten resin.

At least one collar and/or at least one substantially flat metal plate preferably are molded integrally as one or more inserts in the secondary molded portion.

The method further may comprise positioning the collar by at least one positioning projection in the molding die. The positioning projection preferably has a shape substantially corresponding to the inner shape of the collar and the cross-sectional dimension of projection preferably is slightly smaller than the inner diameter of the collar and/or slightly larger than the diameter of one or more holes of the metal flat plate.

The at least one rib preferably comprises at least one first rib and at least one second rib. The first and second ribs preferably having different heights and preferably are alternately and/or continuously arranged.

The invention also relates to a resin molded article that preferably is formed by the molding method described above. The resin molded article preferably has at least one busbar at least partly incorporated along a longitudinal direction inside a long primary molded article. A secondary molded portion is formed integrally on one or more outer surfaces of the primary molded article by insert molding. At least one rib extends substantially in the longitudinal direction on a surface of the primary molded article that is substantially adjacent to the surface facing a gate in a molding die. However, the rib is not a terminal surface where a portion of the busbar is drawn out.

Projecting height of parts of the rib except those supported by the support is shorter than a distance between the surface where the rib is formed and the cavity inner surface of the molding die substantially facing this surface.

The invention relates to a molding die for producing the above-described resin molded article, such that at least one busbar is at least partly incorporated along a longitudinal direction inside a long primary molded article. The primary molded article is set in a molding die and a secondary molded portion is formed integrally on one or more outer surfaces of the primary molded article by insert molding. At least one support extends intermittently along the longitudinal direction on a cavity inner surface of the molding die and projects towards a rib that extends substantially in the longitudinal direction on a surface of the primary molded article for supporting the rib. The surface where the rib is formed is a surface substantially adjacent to the one facing a gate in the molding die, but is not a terminal surface where one portion of the busbar is drawn out.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
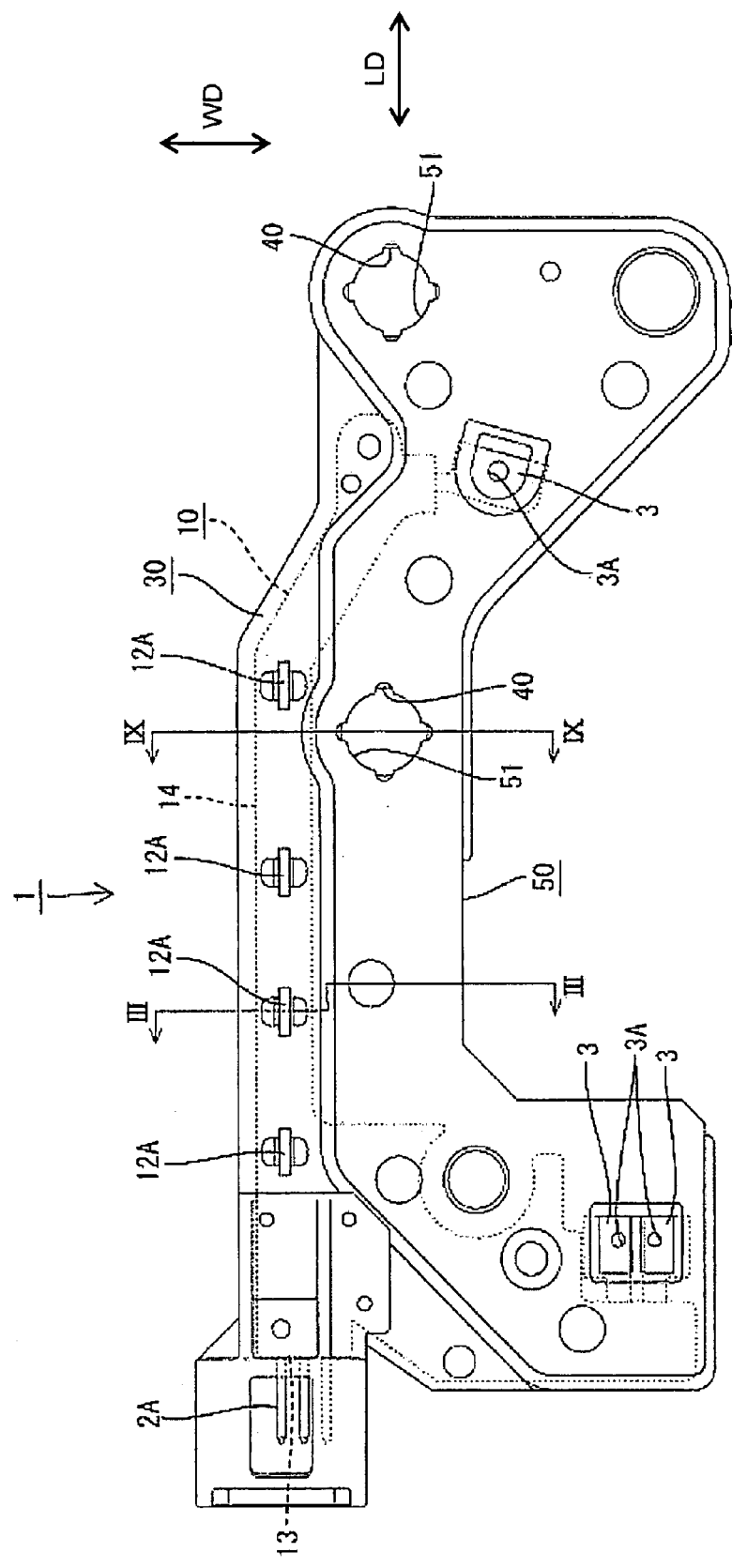
FIG. 1 is a plan view of a resin molded article according to the invention.

A resin molded article according to the invention is identified by the numeral 1 in FIG. 1 and is to be installed inside an automotive transmission. The resin molded article 1 has a laterally long shape and is formed by insert molding so that a primary molded article 10, tubular collars 40 and a substantially flat metal plate 50 are molded integrally as inserts in a secondary molded article 30. Additionally, the primary molded article 10 has at least one busbar 2 embedded therein The flat metal plate 50 is formed with through holes 51 having a smaller diameter than the inner diameter of the collars 40 as shown, and the collars 40 are arranged at the lower side of the flat metal plate 50 at positions substantially coaxial with the holes 51. The holes 51 are for insertion of unillustrated bolts or the like, and the resin molded article 1 is fixed to a valve unit or the like via the collars 40 by inserting bolts from a side of the flat metal plate 50 and spirally engaging them with internal recesses or threads formed in the valve unit or the like arranged inside a transmission casing. It should be noted that reference is made herein to a transverse direction in FIG. 1, a vertical direction in FIG. 1 and a direction normal to the plane of FIG. 1 for a longitudinal direction LD, a width direction WD and a vertical direction VD. Additionally, the front side of the plane of FIG. 1 is an upper side.

Figure 2:
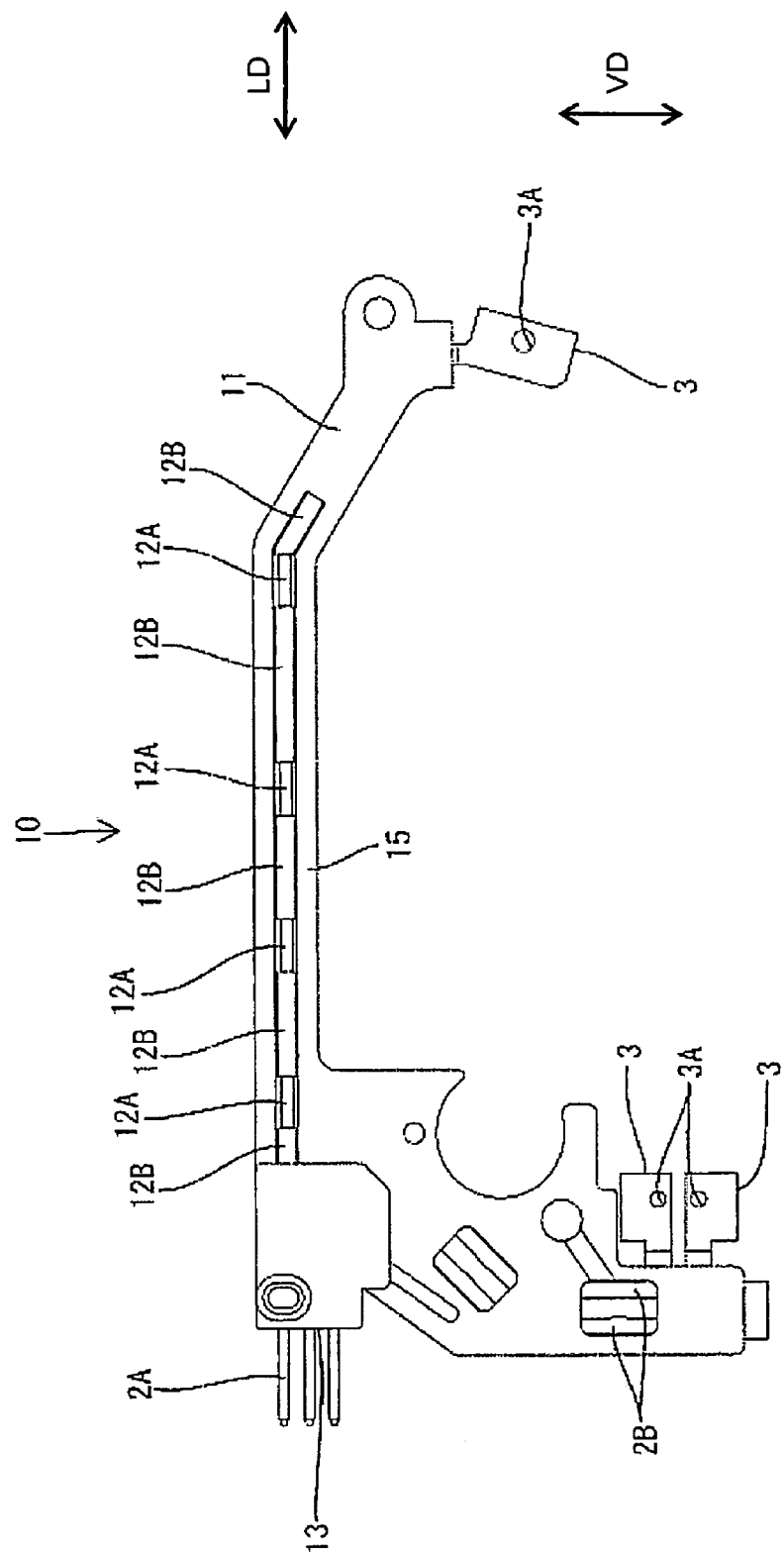
FIG. 2 is a plan view of a primary molded article of the resin molded article.

The primary molded article 10 is made e.g. of synthetic resin or a synthetic resin containing a reinforcement (e.g. 6,6 nylon containing glass fibers), and includes a wide primary molded portion 11 and three busbars 2 arranged therein as shown in FIG. 2. Ends of the busbars 2 at one side are collected at one position, and project out to the left from the left surface of the primary molded portion 11. A terminal surface 13 is defined at the end of the primary molded article 10 where the ends of the busbars 2 are drawn out. One of the busbars 2 defines a first circuit 2A extending along a first extending to the right substantially along the longitudinal direction LD from the end collected side, and the remaining two busbars 2 define second circuits 2B extending substantially normal to the first extending direction of the first circuit 2A and substantially along the width direction WD from the end collected side. A substantially rectangular terminal 3 is formed near the end of each busbar 2. A through hole 3A penetrates the terminal 3 in the vertical direction VD, and is used to rivet or otherwise fix the terminal 3 to an unillustrated mating terminal.

Figure 3:
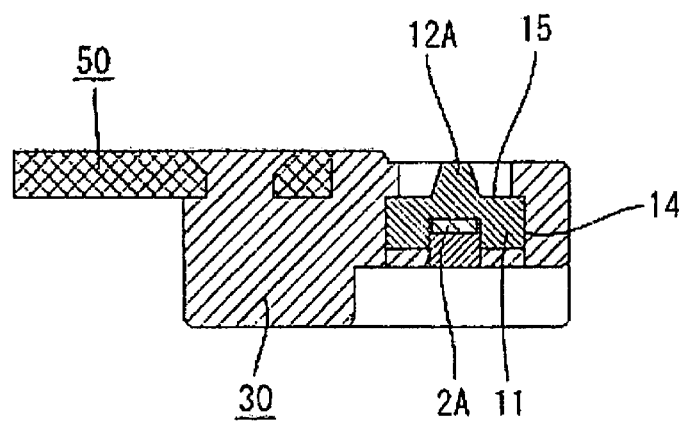
FIG. 3 is a section along III-III of FIG. 1.
Figure 4:
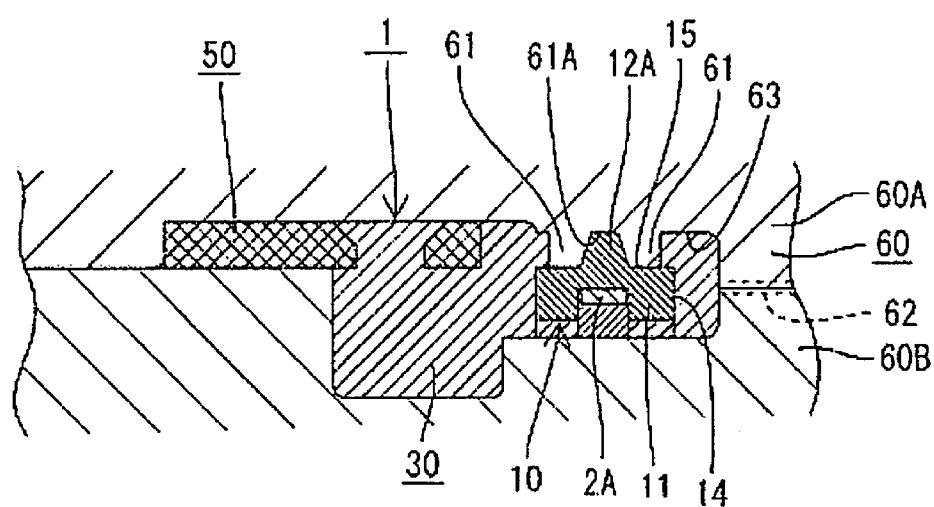
FIG. 4 is a section showing a state where a first rib is supported by supporting portions during the insert molding of the resin molded article.
Figure 9:
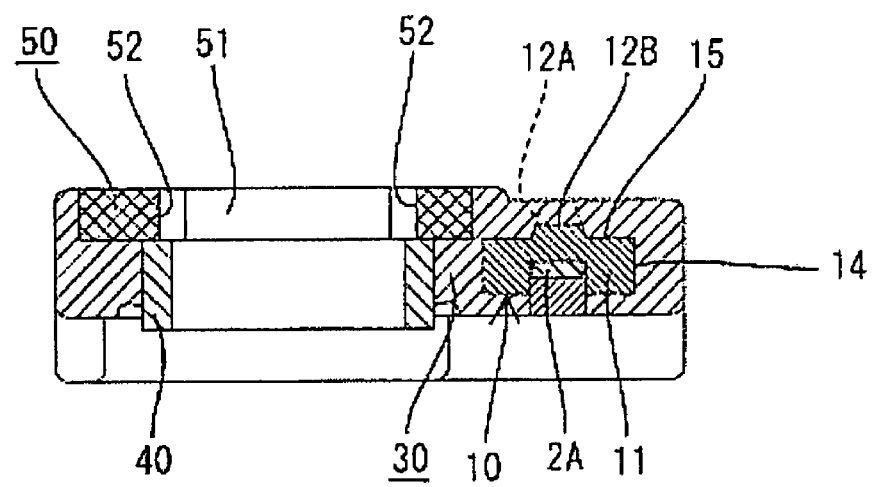
FIG. 9 is a section along IX-IX of FIG. 1.
Figure 10:
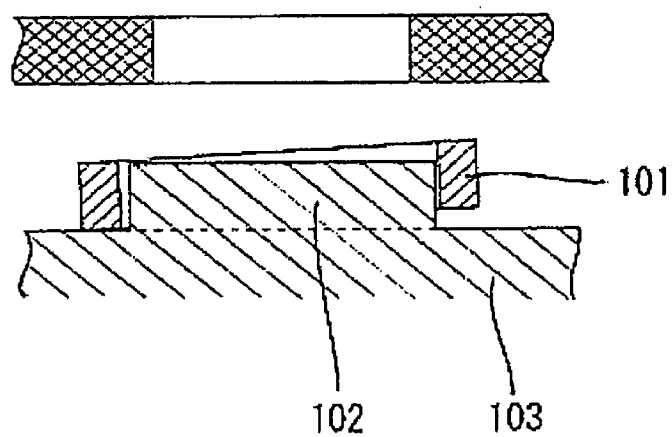
FIG. 10 is a section showing a state where a collar is in an inclined posture in the height range of a positioning projection in a prior art construction.
Figure 11:
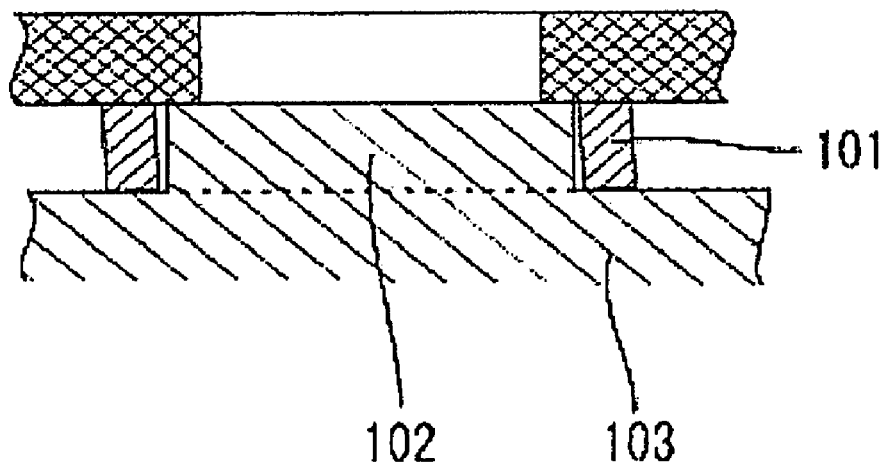
FIG. 11 is a section showing a state where the collar is deformed.

Ribs 12 are formed substantially along the longitudinal direction LD on the upper surface of the primary molded article 10. A surface 15 where this ribs 12 are formed is adjacent to a surface 14 facing a gate 62 of a molding die 60 during the insert molding, as shown in FIG. 4 and also is adjacent to the terminal surface 13, as shown in FIG. 2. As shown in FIG. 9, the ribs 12 include first ribs 12A and second ribs 12B having different heights. More particularly four first ribs 12A and five second ribs 12B are arranged alternately. It should be noted that the rib 12 at a position substantially corresponding to the first circuit 2A of the busbar 2 with respect to vertical projecting direction of the rib 12, as shown in FIG. 3.

Supports 61 are provided intermittently along the longitudinal direction LD on a cavity inner surface 63 of an upper die 60A of the molding die assembly 60 and project towards the first ribs 12A. As shown in FIG. 4, two supports 61 are formed adjacent to the first ribs 12A and sandwich the first ribs 12A at opposite widthwise surfaces that are substantially normal to a resin injection direction from the gate 62. The leading end surfaces of the supports 61 contact the rib formation surface 15, and the leading end surfaces of the first ribs 12A contact a back surface 61A defined between the supports 61. In this way, the supports 61 support the ribs 12A substantially along the vertical direction VD and the width direction WD during the insert molding, and parts supported by the supports 61 are exposed to the outside after the insert molding (see FIG. 1). The leading end surfaces of the first ribs 12A are substantially flush with the outer/upper surface of the secondary molded portion 30 after the insert molding, as shown in FIG. 3.

The second ribs 12B have a smaller height than the first ribs 12A. Specifically, the height of the second ribs 12B is shorter than a distance between the rib formation surface 15 and the cavity inner surface 63 of the molding die 60 facing this surface 15 during the insert molding. Accordingly, as shown in FIG. 1, the second ribs 12B are embedded in the secondary molded portion 30 after the insert molding.

Figure 5:
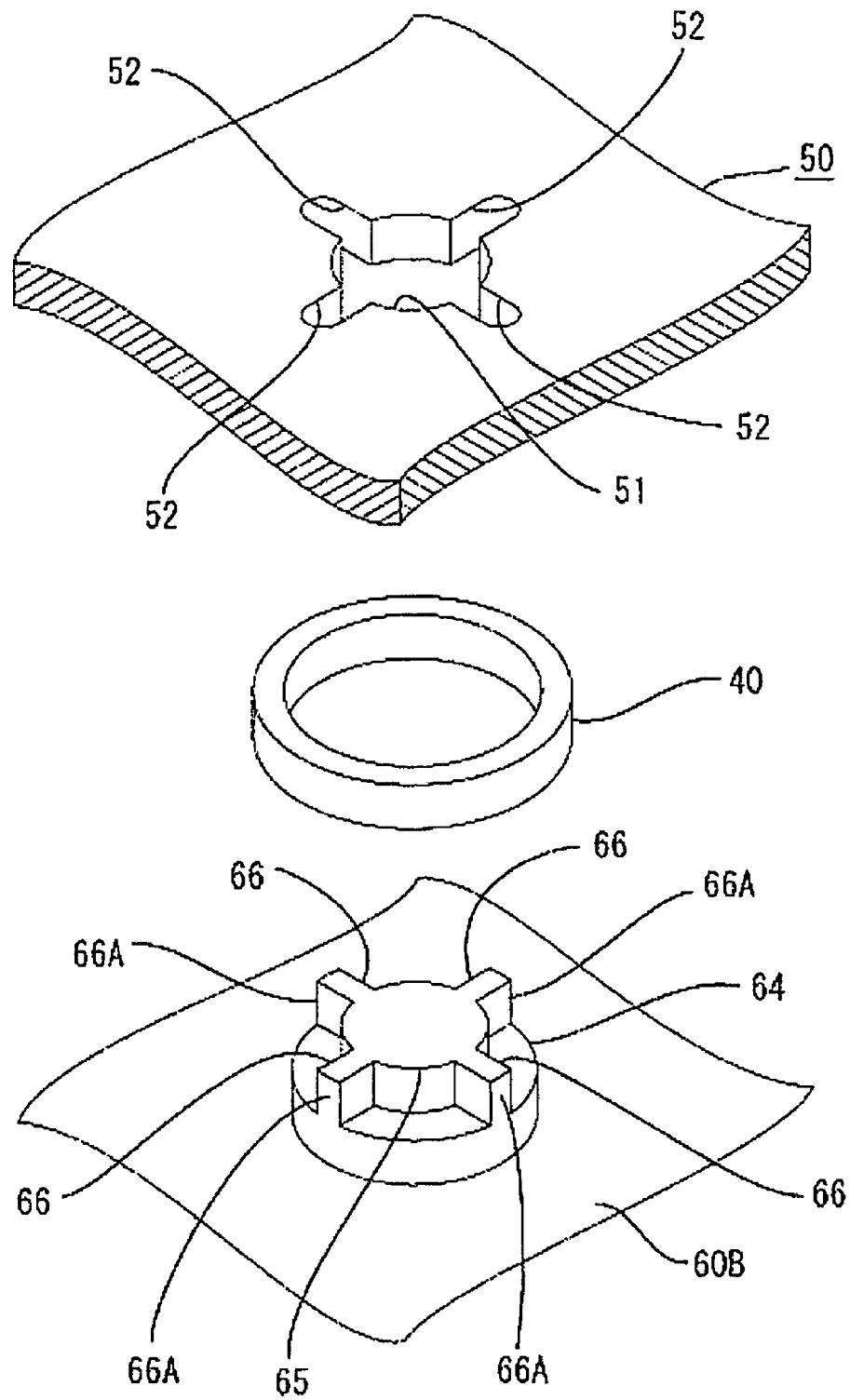
FIG. 5 is an exploded perspective view of a collar, a metal flat plate and a lower die at a position where a positioning projection is provided.

As shown in FIG. 5, positioning projections 64 project from the bottom surface of a lower die 60B of the molding die assembly 60 and are used to position the collars 40 in the lower die 60B. Each positioning projection 64 has a cylindrical or contoured shape substantially inscribing in a circle and substantially corresponding to the inner shape of the collars 40. The diameter of each positioning projection 64 is slightly smaller than the inner diameter of the collars 40 and slightly larger than the diameter of the holes 51 of the flat metal plate 50. The height of the positioning projections 64 is substantially equal to that of the collars 40. A shaft 65 projects up coaxially with the positioning projection 64 at the upper end of each positioning projection 64. The diameter of the shaft 65 is slightly smaller than the diameter of the holes 51 of the flat metal plate 50, so that the shafts 65 can be accommodated in the holes 51 of the flat metal plate 50.

Figure 6:
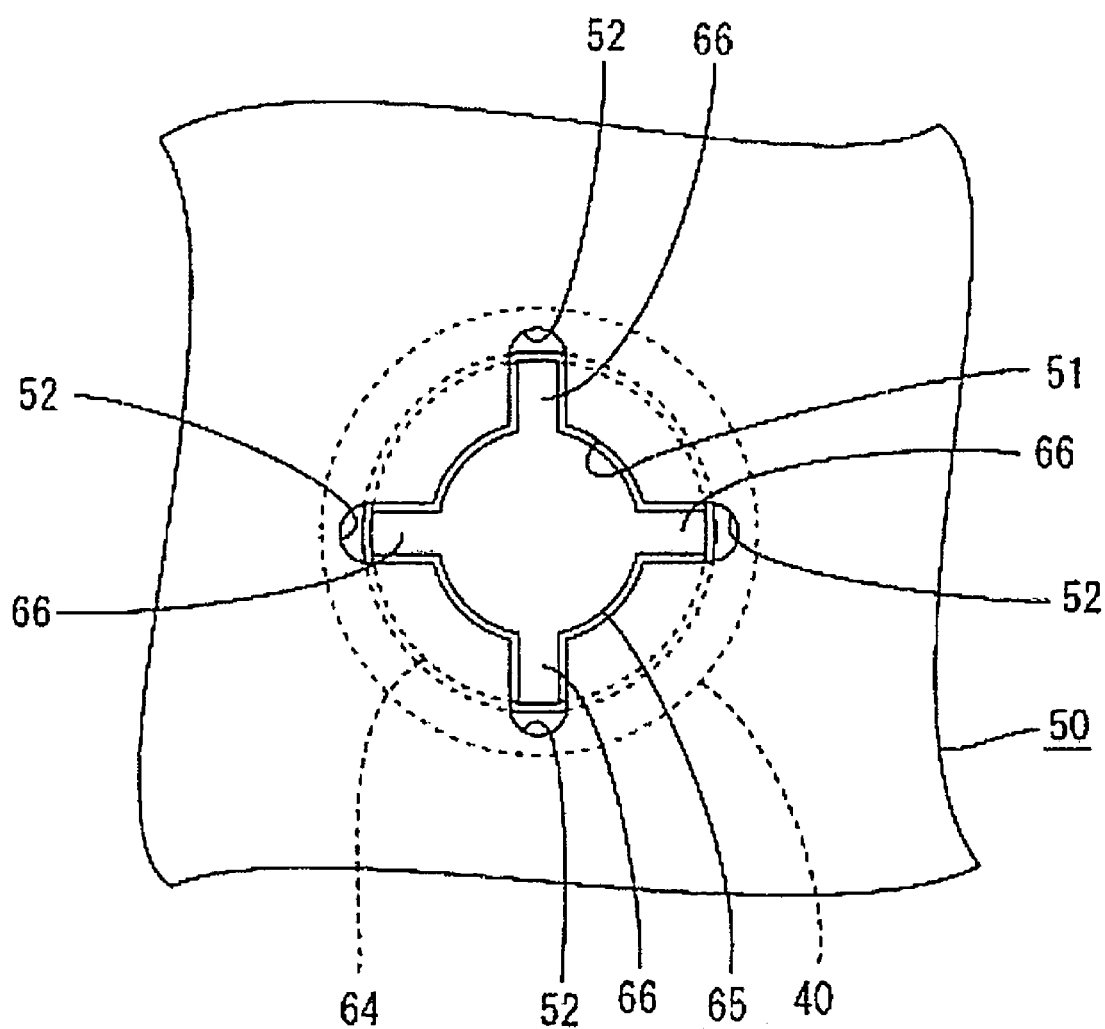
FIG. 6 is a plan view showing a state where the collar and the metal flat plate are set in the lower die.

Four guiding projections 66 are formed on the outer circumferential surface of each shaft 65 and extend substantially radially out from the axial center of the shaft 65 while being spaced apart at substantially even intervals of about 90°. The guiding projections 66 are connected with both the upper end of the positioning projection 64 and the outer circumferential surface of the shaft 65. Guiding surfaces 66A are defined at the outer circumference of the guiding projections 66 and are substantially continuous and flush with the outer circumferential surface of the positioning projection 64. On the other hand, the flat metal plate 50 is formed with notches 52 that extending substantially radially out from the inner circumferential surface of each hole 51. Thus, the flat metal plate 50 can be placed atop the collars 40 after the collars 40 are set on the positioning projections 64, and the guiding projections 66 are accommodated into the respective notches 52. The extension of the notches 52 is set so that the leading ends of the notches 52 are more outward than the inner circumferential surfaces of the collars 40, as shown in FIG. 6.

The primary molded article 10, the collars 40 and the metal flat plate 50 are set in the lower die 60B of the molding die assembly 60. The collars 40 then are passed over the outer peripheries of the guiding surfaces 66A of the guiding projections 66 and are fit onto the positioning projections 64. The inner circumferential surfaces of the collars 40 contact the guiding surfaces 66A to position the collars 40 regardless of how inclined the collars 40 are when being fitted on the guiding projections 66. Therefore, the collars 40 can be fit smoothly onto the positioning projections 64.

Figure 7:
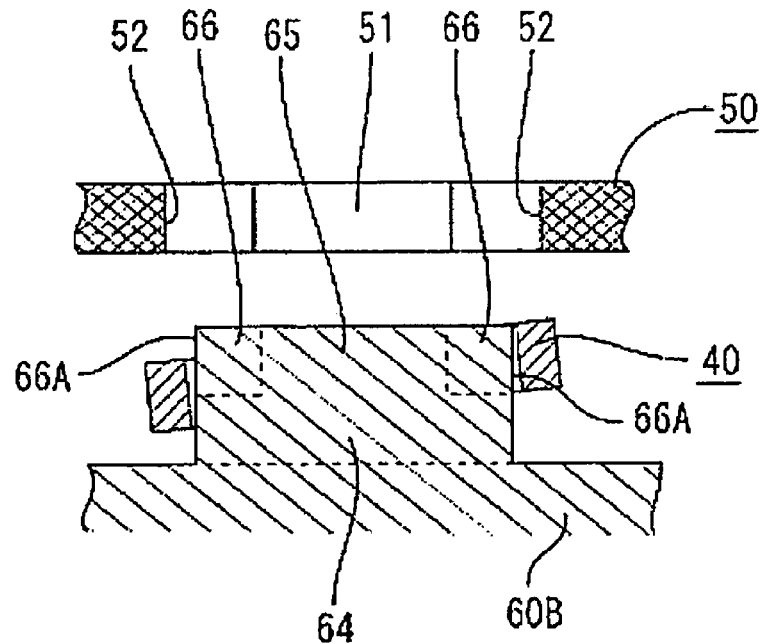
FIG. 7 is a section showing a state where the collar is in an inclined posture in the height range of guiding projections.
Figure 8:
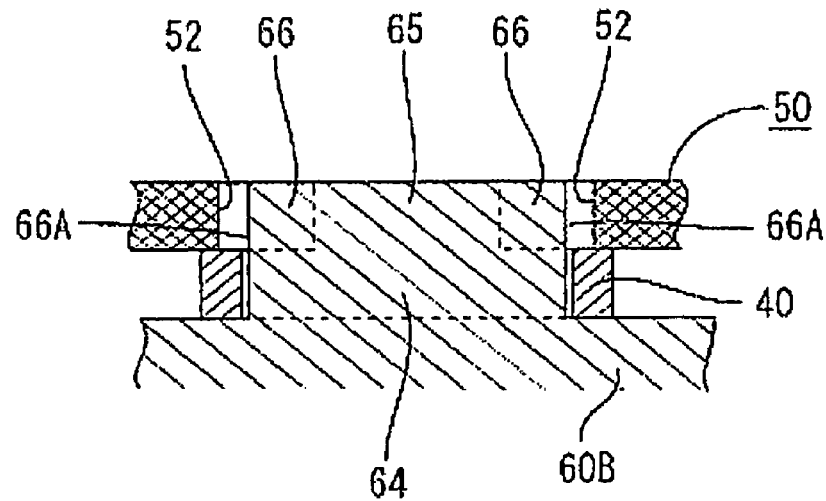
FIG. 8 is a section showing a state where the collar and the metal flat plate are set in proper postures in the lower die.

The inner circumferential surface of the collar 40 might get caught by the guiding surface 66A and tilt as shown in FIG. 7. In such a case, the collar 40 might possibly be deformed if the flat metal plate 50 is set with the collar 40 inclined and the molding die is closed. However, the collar 40 would take such an inclined posture at a distance from the bottom surface of the lower die 60B, and such an inclined posture on the positioning projection 64 would be recognized easily as an improper posture.

Even if the insert molding is carried out with the collar 40 deformed, the deformation of the collar 40 can be known by comparing and checking amounts of the collars 40 exposed at the notches 52 at the four positions. Accordingly, there is no likelihood of producing a defective article. Further, upon placing the flat metal plate 50 atop the collars 40, the shafts 65 can be fit at least partly inside the holes 51 while the guiding projections 66 are accommodated into the notches 52 (see FIG. 6) even if the positional precision of the holes 51 is poor, because the notches 52 are longer than the projecting amounts of the guiding projections 66 in radial directions.

the molding die 60 next is closed, and resin is poured through the gate 62. In a closed state, the first ribs 12A of the primary molded article 10 are supported by the supports 61 as shown in FIG. 4. The primary molded article 10 is held at opposite sides in the width direction WD and substantially in the resin injection direction from the gate 62 with the first ribs 12A sandwiched by the supports 61 at the opposite widthwise surfaces thereof. Thus, there is no likelihood that the primary molded article 10 is displaced when the resin injected from the gate 62 collides with the facing surface 14. Further, the primary molded article 10 is reinforced by the first and second ribs 12A, 12B and there is no likelihood that the primary molded article 10 will displace due to the collision of the resin. Furthermore, the second ribs 12B are embedded in the secondary molded portion 30 after the insert molding and water cannot enter into external clearances that might otherwise exist between the second ribs 12B and the secondary molded portion 30. The molding die 60 then is opened to access the resin molded article 1 in which the primary molded article 10, the collars 40 and the flat metal plate 50 are integrally molded as inserts in the secondary molded portion 30.

The guiding projections 66 are on the distal or upper end of the positioning projections 64. Thus, an inclined collar 40 can be identified easily because such an inclined collar 40 will be at the height of the guiding projections 66 and distanced from the bottom surface of the lower die 60B, rather than at the height of the positioning projections 64. As a result, an undesirable situation where the collar 40 is deformed because the molding die is closed with the collar 40 inclined can be prevented or the risk thereof reduced. Therefore, the primary molded article 10 can be positioned without forming any engaging hole in the terminal surface 13.

The inner circumferential surface of the collar 40 can be brought into contact with the guiding surfaces 66A regardless of which inclined posture the collar 40 takes upon being fit onto the guiding projections 66. Accordingly, the collars 40 can be positioned while being located within the height range of the guiding projections 66 and, therefore, can be fit smoothly onto the positioning projections 64.

The flat metal plate 50 can be set in the molding die 60 even if the positional precision of the holes 51 of the metal flat plate 50 is poor. Further, even if the inclined posture of the collar 40 cannot be found out before the insert molding, whether the collar 40 is deformed can be easily confirmed by checking the amounts of the collar 40 exposed from the notches 52 after the insert molding.

The rib 12 increases the strength of the primary molded article 10 and ensures that the molten resin injected from the gate 62 during the insert molding prevents deformation of the primary molded article 10. Further, the supports 61 of the molding die assembly 60 support the first ribs 12A and prevent a forward displacement of the primary molded article 10 in the injection direction of the molten resin.

Parts around the first ribs 12A that were supported by the supports 61 remain as recesses on the outer surface of the resin molded article 1 after the insert molding. However, the second ribs 12B are covered by the secondary molded portion 30. Thus, problems such as water entrance through a boundary portion between the rib 12 and the secondary molded portion 30 can be reduced.

The supports 61 sandwich the first ribs 12A at opposite side surfaces. As a result, both forward and backward displacements of the primary molded article 10 in the injection direction of the molten resin can be prevented.

The invention is not limited to the above described and illustrated embodiment. For example, the following embodiments are also embraced by the technical scope of the present invention as defined by the claims.

Although the second ribs 12B are embedded in the secondary molded portion 30 in the foregoing embodiment, they may be at least partly exposed to the outside after the insert molding.

Although two supports 61 sandwich the first ribs 12A from opposite sides in the foregoing embodiment, the support 61 may be provided at one position to support the surfaces of the ribs 12A opposite to those facing the gate 62 according to the invention.

What is claimed is:
1. A method for producing a resin molded article comprising:
    molding a long primary molded article so that at least one busbar is at least partly incorporated in the primary molded article to extend substantially along a longitudi- nal direction of the primary molded article and so that at least one rib extends substantially in the longitudinal direction on a surface of the primary molded article but not a terminal surface where one portion of the busbar is drawn out, the molding of the primary molded article being carried so that the rib has at least one first section with a first projecting height and a plurality of second sections with second projecting heights less than the first projecting height;

setting the primary molded article in a molding die so that the surface with the rib is substantially adjacent to a surface facing a gate in the molding die; and supporting the primary molded article with first and second supports projecting from a cavity inner surface of the molding die and extending along the longitudinal direction so that the first and second supports engage the first section of the rib and so that the inner surface of the molding die is spaced from the second sections of the rib; and forming a secondary molded portion integrally on at least one outer surface of the primary molded article by insert molding including injecting resin transverse to the longitudinal direction at a location substantially aligned with the supports.

2. The method of claim 1, wherein the step of supporting the rib comprises sandwiching substantially opposite side surfaces of the rib at an angle to an injection direction.

3. The method of claim 1, further comprising integrally molding at least one collar and at least one substantially flat metal plate as inserts in the secondary molded portion.

4. The method of claim 3, further comprising a step of positioning the collar by at least one positioning projection in the molding die, the positioning projection having a shape substantially corresponding to an inner shape of the collar and having a diameter smaller than an inner diameter of the collar.

* * * * *